A. F. PEETERS.
GLASS FURNACE.
APPLICATION FILED APR. 4, 1918.
1,293,533.
Patented Feb. 4, 1919.
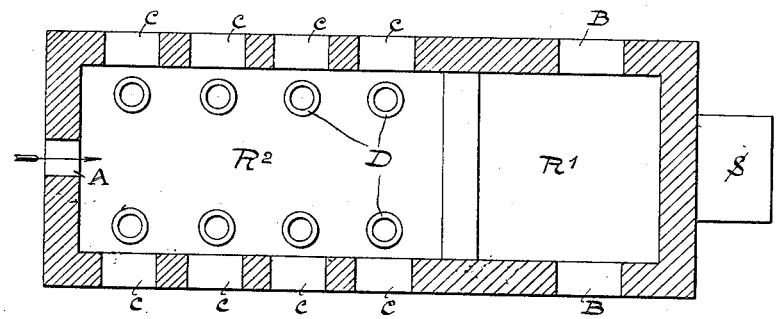
Alexander Franz Peeters
Inventor

UNITED STATES PATENT OFFICE.

ALEXANDER FRANZ PEETERS, OF LEERDAM, NETHERLANDS, ASSIGNOR TO NAAMLOOZE VENNOOTSCHAP GLASFABRIEK LEERDAM, OF LEERDAM, NETHERLANDS, A COMPANY ORGANIZED UNDER THE LAWS OF THE KINGDOM OF THE NETHERLANDS.

GLASS-FURNACE.

1,293,533.

Specification of Letters Patent.

Patented Feb. 4, 1919.

Application filed April 4, 1918. Serial No. 226,764.

*To all whom it may concern:*

Be it known that I, ALEXANDER FRANZ PEETERS, a subject of the Queen of the Netherlands, residing at Leerdam, the Netherlands, have invented certain new and useful Improvements in Glass-Furnaces, of which the following is a specification.

The known glass-furnaces, wherein the raw materials are melted down directly on the bottom (the so-called tank-furnaces), generally have in horizontal section the shape of a rectangle. In such furnaces the raw materials are melted down and the molten glass is kept at the required high temperature by a stream of hot gases circulating over the batch.

The accompanying drawing illustrates somewhat diagrammatically in a horizontal sectional view a furnace embodying the present invention.

In this furnace, the hot gases are introduced through an opening A (called "burner") in the rear wall of the furnace; the raw materials are fed through the openings B, B. The space R', located at the side of the flue S, is the melting-space, wherein the raw materials are converted from the solid condition into the liquid form. The walls of the space into which opens the burner, where the glass is in the molten condition, have a number of so-called working-openings C, through which the molten glass is taken up by the workmen. In front of each working-opening is a so-called "floater" D or like device having for its object to withhold the slag and other impurities in a manner well-known in the art. The hot gases, after flowing through the furnace, are discharged through the flue S, which is in communication with the furnace by an opening in the front wall, *i. e.* in the wall opposite the burner A. The flame from the burner is fed by liquid fuel introduced into the furnace under suitable pressure.

Now, the present invention is characterized in that the working-space is at the side of the burner and the melting-space at the side of the flue, in which feature it is clearly distinguished from the known furnaces, in which the melting space is at the side of the burner and the working space at the side of the flue.

The new arrangement has some very important advantages over the old one.

In the first place the solid raw materials or batch are fed into the furnace at a point where the temperature of the flame is highest, and the molten glass from the melting space, according to the removal of the contents of the working space by means of the pipes or tubes usually employed, gradually flows to the zone where the temperature is lowest. It should be understood that a flame fed by liquid fuel under pressure is hottest at a point at a considerable distance from the burner, so that by suitably regulating this pressure, it is always possible to have the zone of the highest temperature coincide with the melting space. With this arrangement the batch is melted down in an efficient manner, whereas no unnecessarily high temperatures occur in the working-out compartment.

A further advantageous feature of the new furnace is the fact that the combustible (such as for instance tar) from the burner enters a space where the glass has a very high temperature, so that no condensation or deposition of carbon can take place, as is the case in the known furnaces wherein the combustible is blown directly on the cold batch. Therefore no undesired coloration of the mass is to be feared.

Finally, the usual furnaces have the objectionable feature that the finely reduced parts of the raw materials may be blown away by the high speed stream of hot gases from the burner. The new construction also eliminates this disadvantage.

Having now particularly described and ascertained the nature of my said invention and in what manner the same is to be performed, I declare that what I claim is:

A glass furnace having a melting compartment and a working-out compartment in communication therewith and located substantially at the same level, wherein the batch is melted and the molten glass kept at the required temperature by a flame fed by liquid fuel which is introduced under pressure into the furnace at that end of the working-out compartment which is located opposite the melting compartment.

In testimony whereof I have affixed my signature in presence of two witnesses.

ALEXANDER FRANZ PEETERS.

Witnesses:
    MANTO FÉHERE,
    H. VERHEGED.